United States Patent
Ansbaugh (10) Patent No.: US 12,299,349 B2
(45) Date of Patent: May 13, 2025

(54) SYSTEMS AND METHODS FOR MEASUREMENT OF MULTICOMPONENT ROUND-TRIP AUDIO LATENCY

(71) Applicant: Mixhalo Corp., San Francisco, CA (US)

(72) Inventor: Nicholas E. Ansbaugh, Marina Del Rey, CA (US)

(73) Assignee: Mixhalo Corp., San Francisco, CA (US)

( * ) Notice: Subject to any disclaimer, the term of this patent is extended or adjusted under 35 U.S.C. 154(b) by 198 days.

(21) Appl. No.: 18/141,584

(22) Filed: May 1, 2023

(65) Prior Publication Data
US 2023/0350635 A1  Nov. 2, 2023

Related U.S. Application Data

(60) Provisional application No. 63/336,454, filed on Apr. 29, 2022.

(51) Int. Cl.
G06F 3/16 (2006.01)
G10L 21/0208 (2013.01)

(52) U.S. Cl.
CPC .......... *G06F 3/165* (2013.01); *G10L 21/0208* (2013.01)

(58) Field of Classification Search
CPC ............................. G06F 3/165; G10L 21/0208
See application file for complete search history.

(56) References Cited

U.S. PATENT DOCUMENTS

| | | | |
|---|---|---|---|
| 7,916,653 B2 * | 3/2011 | Firestone | H04L 12/66 370/252 |
| 9,307,334 B2 | 4/2016 | Wang | |
| 11,195,543 B2 | 12/2021 | Gossard et al. | |
| 11,791,894 B2 * | 10/2023 | Hu | H04W 24/08 398/30 |
| 2015/0032797 A1 * | 1/2015 | Pan | H04L 67/01 709/203 |
| 2015/0195428 A1 * | 7/2015 | Lee | H04N 21/43079 348/515 |
| 2018/0329670 A1 * | 11/2018 | Einziger | H04L 65/70 |
| 2019/0342659 A1 * | 11/2019 | Lau | H04S 7/301 |
| 2022/0343937 A1 * | 10/2022 | Gossard | G10L 21/055 |
| 2022/0390580 A1 * | 12/2022 | Bonde | H04W 4/023 |
| 2023/0031866 A1 * | 2/2023 | Hudson | H04L 65/80 |
| 2023/0114327 A1 * | 4/2023 | Gidley | G10H 1/0058 370/310 |

* cited by examiner

*Primary Examiner* — Tadesse Hailu
(74) *Attorney, Agent, or Firm* — Cesari and McKenna, LLP (57) ABSTRACT

A method of measuring round-trip audio latency includes communicatively coupling a soundcard to a first mobile device, a second mobile device, and an audio interface. The method also includes transmitting a first audio signal to the soundcard by the first mobile device. The method also includes receiving the first audio signal by the second mobile device via an audio server computing device communicatively coupled to the audio interface. The method also includes transmitting a second audio signal to the soundcard by the second mobile device. The method also includes receiving the second audio signal from the soundcard by the first mobile device. The method also includes calculating a round-trip audio latency by the first mobile device based on the transmitted first audio signal and the received second audio signal.

20 Claims, 5 Drawing Sheets

SYSTEMS AND METHODS FOR MEASUREMENT OF MULTICOMPONENT ROUND-TRIP AUDIO LATENCY

RELATED APPLICATION(S)

This application claims priority to U.S. Provisional Patent Application No. 63/336,454, filed on Apr. 29, 2022, the entirety of which is incorporated herein by reference.

FIELD OF THE INVENTION

This invention relates generally to the field of audio latency. More specifically, the invention relates to systems and methods for measuring and calculating round-trip audio latency of a multicomponent system.

BACKGROUND

Round-trip audio latency is the amount of time between transmission of an audio signal and acknowledgement of receipt of the audio signal. For many applications, understanding round-trip audio latency involves performing measurements across several components of a multicomponent system. However, performing such measurements can be time-consuming and often do not result in accurate round-trip audio latency calculations. Therefore, there is a need for systems and methods that simplify round-trip audio latency calculations with improved efficiency and accuracy.

SUMMARY

The present invention includes systems and methods for measuring round-trip audio latency. For example, the present invention includes systems and methods for communicatively coupling a soundcard to a first mobile device, a second mobile device, and an audio interface. The present invention includes systems and methods for transmitting a first audio signal to the soundcard by the first mobile device and receiving the first audio signal by the second mobile device via an audio server computing device communicatively coupled to the audio interface. The present invention includes systems and methods for transmitting a second audio signal to the soundcard by the second mobile device and receiving the second audio signal from the soundcard by the first mobile device. The present invention includes systems and methods for calculating the round-trip audio latency by the first mobile device based on the transmitted first audio signal and the received second audio signal.

In one aspect, the invention includes a computerized method of measuring round-trip audio latency. The computerized method includes communicatively coupling a soundcard to a first mobile device, a second mobile device, and an audio interface. The computerized method also includes transmitting, by the first mobile device, a first audio signal to the soundcard. The computerized method also includes receiving, by the second mobile device, the first audio signal via an audio server computing device communicatively coupled to the audio interface.

The computerized method further includes transmitting, by the second mobile device, a second audio signal to the soundcard. The computerized method also includes receiving, by the first mobile device, the second audio signal from the soundcard. The computerized method further includes calculating, by the first mobile device, a round-trip audio latency based on the transmitted first audio signal and the received second audio signal.

In some embodiments, the soundcard is an external soundcard. For example, in some embodiments, an output of the external soundcard is communicatively coupled to an input of the audio interface. In some embodiments, an input of the external soundcard is communicatively coupled to an output of the second mobile device.

In some embodiments, the computerized method further includes generating for display, by the first mobile device, a first waveform corresponding to the transmitted first audio signal and a second waveform corresponding to the received second audio signal. In some embodiments, the round-trip audio latency is calculated based on the first waveform and the second waveform. For example, in some embodiments, the round-trip audio latency is calculated based on a time-delay between the first waveform and the second waveform.

In some embodiments, the computerized method further includes generating for display, by the first mobile device, the round-trip audio latency on the first mobile device. In some embodiments, the computerized method further includes transmitting, by the first mobile device, a notification including the round-trip audio latency to the second mobile device. For example, in some embodiments, the computerized method further includes generating for display, by the second mobile device, the notification including the round-trip audio latency on the second mobile device.

In another aspect, the invention includes a system for measuring round-trip audio latency. The system includes an audio interface communicatively coupled to a soundcard and an audio server computing device. The system also includes a first mobile device communicatively coupled to the soundcard. The first mobile device is configured to transmit a first audio signal to the soundcard. The first mobile device is also configured to receive a second audio signal from the soundcard. The first mobile device is also configured to calculate a round-trip audio latency based on the transmitted first audio signal and the received second audio signal.

The system further includes a second mobile device communicatively coupled to the soundcard and communicatively coupled to the audio server computing device over a network. The second mobile device is configured to receive the first audio signal via the audio server computing device. The second mobile device is also configured to transmit the second audio signal to the soundcard.

In some embodiments, the soundcard is an external soundcard. For example, in some embodiments, an output of the external soundcard is communicatively coupled to an input of the audio interface. In some embodiments, an input of the external soundcard is communicatively coupled to an output of the second mobile device.

In some embodiments, the first mobile device is further configured to generate for display a first waveform corresponding to the transmitted first audio signal and a second waveform corresponding to the received second audio signal. In some embodiments, the round-trip audio latency is calculated based on the first waveform and the second waveform. For example, in some embodiments, the round-trip audio latency is calculated based on a time-delay between the first waveform and the second waveform.

In some embodiments, the first mobile device is further configured to generate for display the round-trip audio latency on the first mobile device. In some embodiments, the first mobile device is further configured to transmit a notification including the round-trip audio latency to the second mobile device. For example, in some embodiments, the second mobile device is further configured to generate for display the notification including the round-trip audio latency on the second mobile device.

These and other aspects of the invention will be more readily understood from the following descriptions of the invention, when taken in conjunction with the accompanying drawings and claims.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
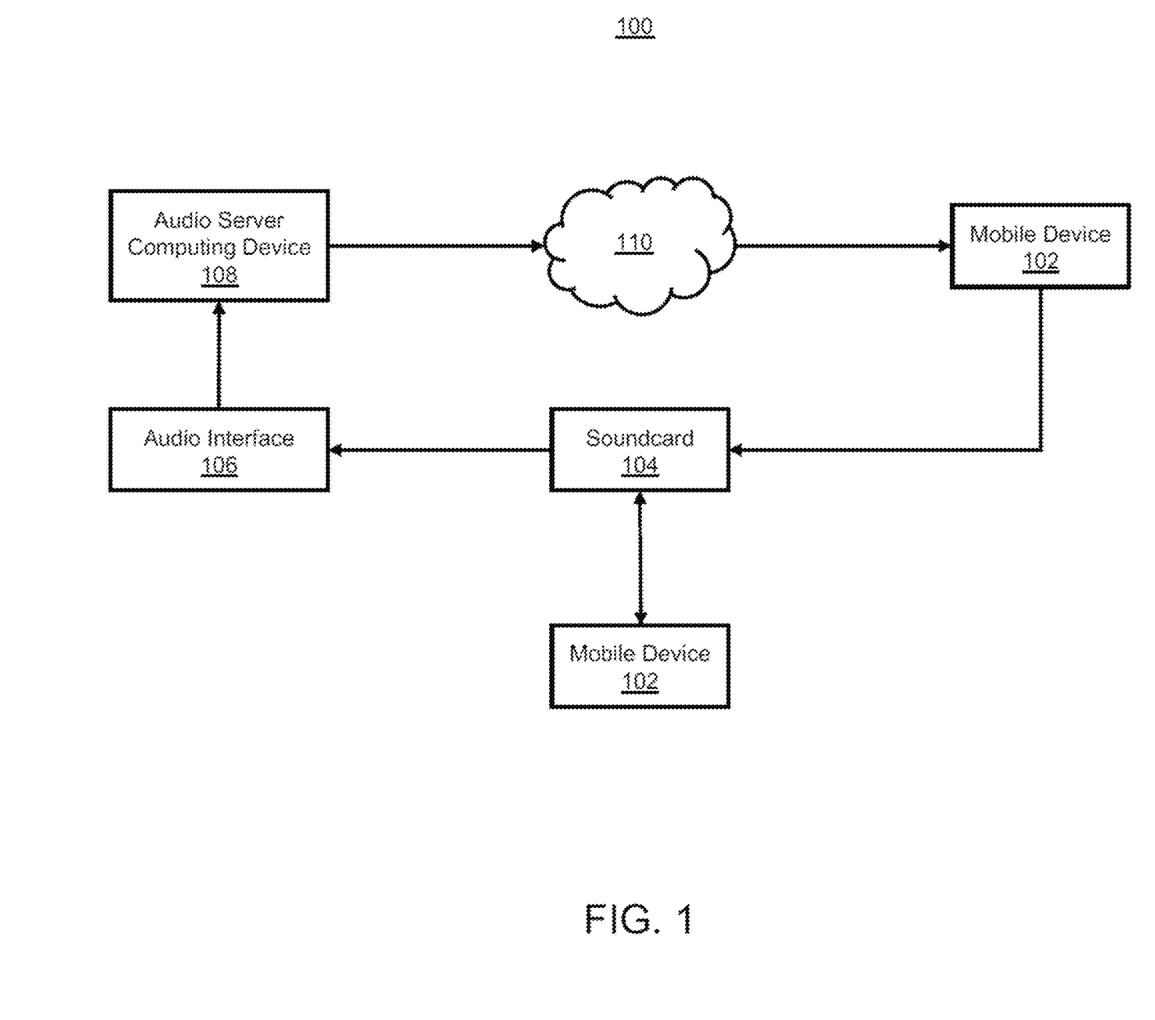
FIG. 1 is a schematic diagram of a system architecture for measuring round-trip audio latency, according to an illustrative embodiment of the invention.

FIG. 1 is a schematic diagram of a system architecture 100 for measuring round-trip audio latency. System 100 includes two or more mobile devices 102 communicatively coupled to a soundcard 104. In some embodiments, the mobile devices 102 comprise one of a smartphone, tablet, or a laptop. In some embodiments, the soundcard 104 is a portable device with one or more outputs for transmitting audio from a first mobile device 102 (e.g., a laptop) to an audio interface 106 and one or more inputs for receiving audio from a second mobile device 102 (e.g., a smartphone). An exemplary soundcard 104 is the CableCreation™ USB Audio Adapter External Soundcard (cablecreation.com). In one example, the soundcard 104 can be communicatively coupled to the first mobile device 102 via a USB 2.0 connection which enables the soundcard 104 to receive audio from the first mobile device 102. The soundcard 104 is also communicatively coupled to an audio interface 106. For example, one or more outputs of the soundcard 104 can be coupled to one or more inputs of the audio interface 106 via a physical cable. An exemplary audio interface 106 is the UltraLite AVB™ audio interface device available from MOTU, Inc. of Cambridge, Massachusetts. An audio server computing device 108 is communicatively coupled to the audio interface 106. The audio server computing device 108 and at least one of the mobile devices 102 of system 100 are configured to transmit and receive data across a network 110.

Figure 2:
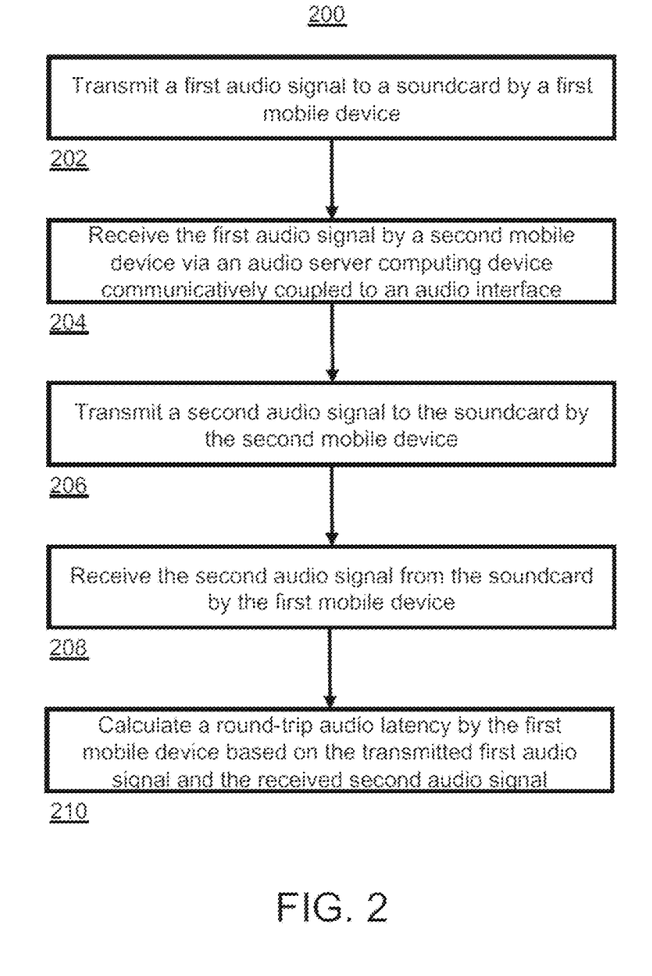
FIG. 2 is a schematic flow diagram illustrating computerized method steps for measuring round-trip audio latency, according to an illustrative embodiment of the invention.

As illustrated in FIG. 1, system 100 can be used for measuring round-trip audio latency. For example, FIG. 2 is a schematic flow diagram illustrating a process 200 for measuring round-trip audio latency. Process 200 begins by transmitting a first audio signal to a soundcard 104 by a first mobile device 102 at step 202. In some embodiments, the soundcard 104 is an external soundcard. For example, in some embodiments, an output of the external soundcard is communicatively coupled to an input of an audio interface 106. In some embodiments, an input of the external soundcard is communicatively coupled to an output of a second mobile device 102.

Process 200 continues by receiving the first audio signal by the second mobile device 102 via an audio server computing device 108 communicatively coupled to the audio interface 106 at step 204. Process 200 continues by transmitting a second audio signal to the soundcard 104 by the second mobile device 102 at step 206. Process 200 continues by receiving the second audio signal from the soundcard 104 by the first mobile device 102 at step 206. Process 200 finishes by calculating a round-trip audio latency by the first mobile device 102 based on the transmitted first audio signal and the received second audio signal at step 210.

In some embodiments, process 200 includes generating for display a first waveform corresponding to the transmitted first audio signal and a second waveform corresponding to the received second audio signal by the first mobile device 102. In some embodiments, the round-trip audio latency is calculated based on the first waveform and the second waveform. For example, in some embodiments, the round-trip audio latency is calculated based on a time-delay between the first waveform and the second waveform.

In some embodiments, process 200 further includes generating for display the round-trip audio latency on the first mobile device 102. In some embodiments, process 200 further includes transmitting a notification including the round-trip audio latency to the second mobile device 102 by the first mobile device 102. For example, in some embodiments, process 200 further includes generating for display the notification including the round-trip audio latency on the second mobile device 102.

As discussed in relation to FIG. 1, process 200 can be implemented using a system 100 for measuring round-trip audio latency. The system 100 includes an audio interface 106 communicatively coupled to a soundcard 104 and an audio server computing device 108. The system 100 also includes a first mobile device 102 communicatively coupled to the soundcard 104. The first mobile device 102 is configured to transmit a first audio signal to the soundcard 104. The first mobile device 102 is also configured to receive a second audio signal from the soundcard 104. The first mobile device 102 is also configured to calculate a round-trip audio latency based on the transmitted first audio signal and the received second audio signal.

The system 100 further includes a second mobile device 102 communicatively coupled to the soundcard 104 and communicatively coupled to the audio server computing device 108 over a network 110. The second mobile device 102 is configured to receive the first audio signal via the audio server computing device 108. The second mobile device 102 is also configured to transmit the second audio signal to the soundcard 104.

In some embodiments, the soundcard 104 is an external soundcard. For example, in some embodiments, an output of the external soundcard is communicatively coupled to an input of the audio interface 106. In some embodiments, an input of the external soundcard is communicatively coupled to an output of the second mobile device 102.

In some embodiments, the first mobile device 102 is further configured to generate for display a first waveform corresponding to the transmitted first audio signal and a second waveform corresponding to the received second audio signal. In some embodiments, the round-trip audio latency is calculated based on the first waveform and the second waveform. For example, in some embodiments, the round-trip audio latency is calculated based on a time-delay between the first waveform and the second waveform.

In some embodiments, the first mobile device 102 is further configured to generate for display the round-trip audio latency on the first mobile device 102. In some embodiments, the first mobile device 102 is further configured to transmit a notification including the round-trip audio latency to the second mobile device 102. For example, in some embodiments, the second mobile device 102 is further configured to generate for display the notification including the round-trip audio latency on the second mobile device 102.

Figure 3:
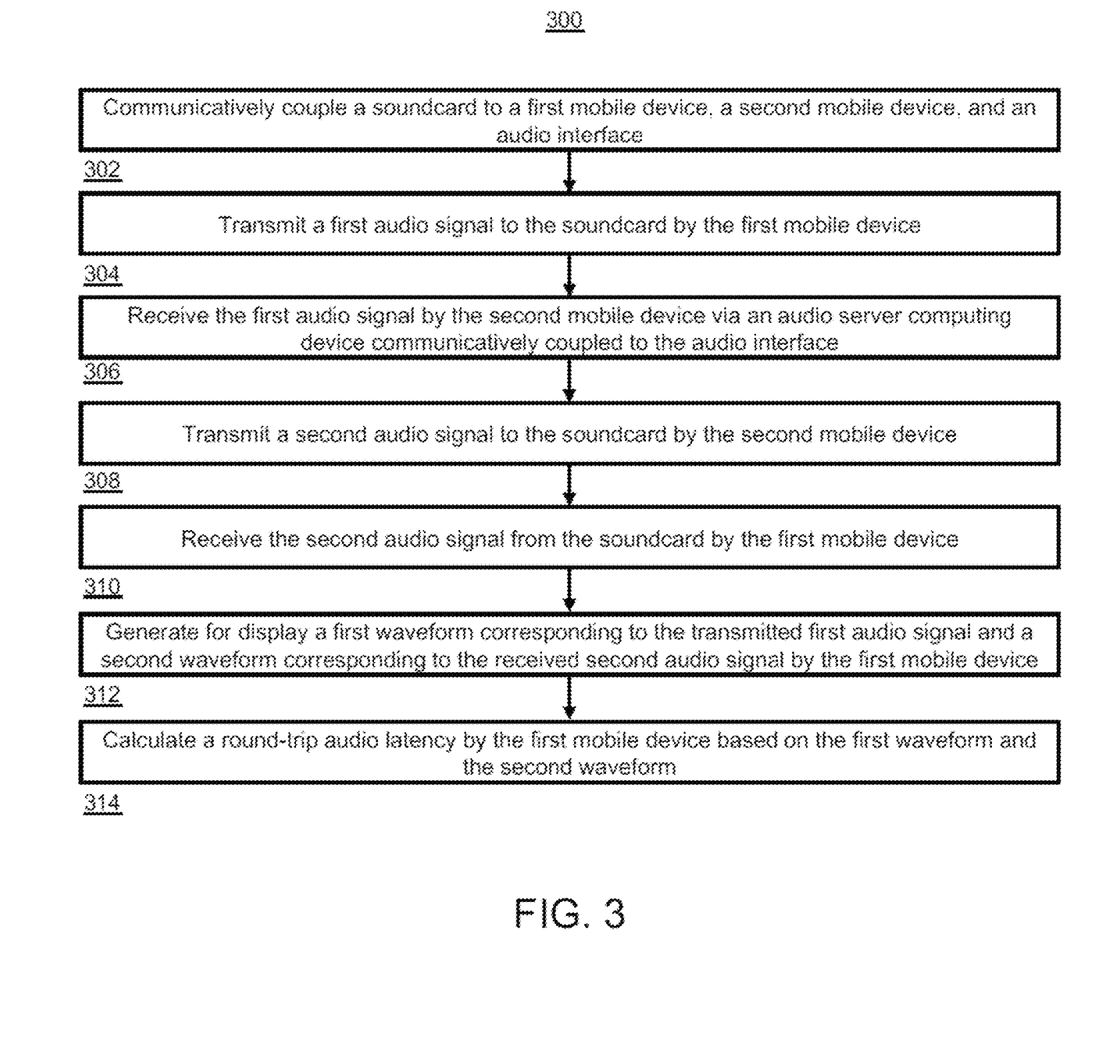
FIG. 3 is a schematic flow diagram illustrating computerized method steps for measuring round-trip audio latency, according to an illustrative embodiment of the invention.

FIG. 3 is a schematic flow diagram illustrating a process 300 for measuring round-trip audio latency. Process 300 begins by communicatively coupling a soundcard 104 to a first mobile device 102, a second mobile device 102, and an audio interface 106 at step 302. In some embodiments, the soundcard 104 is an external soundcard. For example, in some embodiments, an output of the external soundcard is communicatively coupled to an input of the audio interface 106. In some embodiments, an input of the external soundcard is communicatively coupled to an output of the second mobile device 102.

Process 300 continues by transmitting a first audio signal to the soundcard 104 by the first mobile device 102 at step 304. Process 300 continues by receiving the first audio signal by the second mobile device 102 via an audio server computing device 108 communicatively coupled to the audio interface 106 at step 306. Process 300 continues by transmitting a second audio signal to the soundcard 104 by the second mobile device 102 at step 308. Process 300 continues by receiving the second audio signal from the soundcard 104 by the first mobile device 102 at step 310.

Process 300 continues by generating for display a first waveform corresponding to the transmitted first audio signal and a second waveform corresponding to the received second audio signal by the first mobile device 102 at step 312. Process 300 finishes by calculating a round-trip audio latency by the first mobile device 102 based on the first waveform and the second waveform at step 314. For example, in some embodiments, the round-trip audio latency is calculated based on a time-delay between the first waveform and the second waveform.

In some embodiments, process 300 includes generating for display the round-trip audio latency on the first mobile device. In some embodiments, process 300 further includes transmitting a notification including the round-trip audio latency to the second mobile device. For example, in some embodiments, process 300 further includes generating for display the notification including the round-trip audio latency on the second mobile device.

As discussed in relation to FIG. 1, process 300 can be implemented using a system 100 for measuring round-trip audio latency. The system 100 includes an audio interface 106 communicatively coupled to a soundcard 104 and an audio server computing device 108. The system 100 also includes a first mobile device 102 communicatively coupled to the soundcard 104. The system 100 further includes a second mobile device 102 communicatively coupled to the soundcard 104 and communicatively coupled to the audio server computing device 108 over a network 110. In some embodiments, the soundcard 104 is an external soundcard. For example, in some embodiments, an output of the external soundcard is communicatively coupled to an input of the audio interface 106. In some embodiments, an input of the external soundcard is communicatively coupled to an output of the second mobile device 102.

The first mobile device 102 is configured to transmit a first audio signal to the soundcard 104. The first mobile device 102 is also configured to receive a second audio signal from the soundcard 104. The first mobile device 102 is also configured to generate for display a first waveform corresponding to the transmitted first audio signal and a second waveform corresponding to the received second audio signal. The first mobile device 102 is also configured to calculate a round-trip audio latency based on the first waveform and the second waveform. For example, in some embodiments, the round-trip audio latency is calculated based on a time-delay between the first waveform and the second waveform.

The second mobile device 102 is configured to receive the first audio signal via the audio server computing device 108. The second mobile device 102 is also configured to transmit the second audio signal to the soundcard 104.

In some embodiments, the first mobile device 102 is further configured to generate for display the round-trip audio latency on the first mobile device 102. In some embodiments, the first mobile device 102 is further configured to transmit a notification including the round-trip audio latency to the second mobile device 102. For example, in some embodiments, the second mobile device 102 is further configured to generate for display the notification including the round-trip audio latency on the second mobile device 102.

Figure 4:
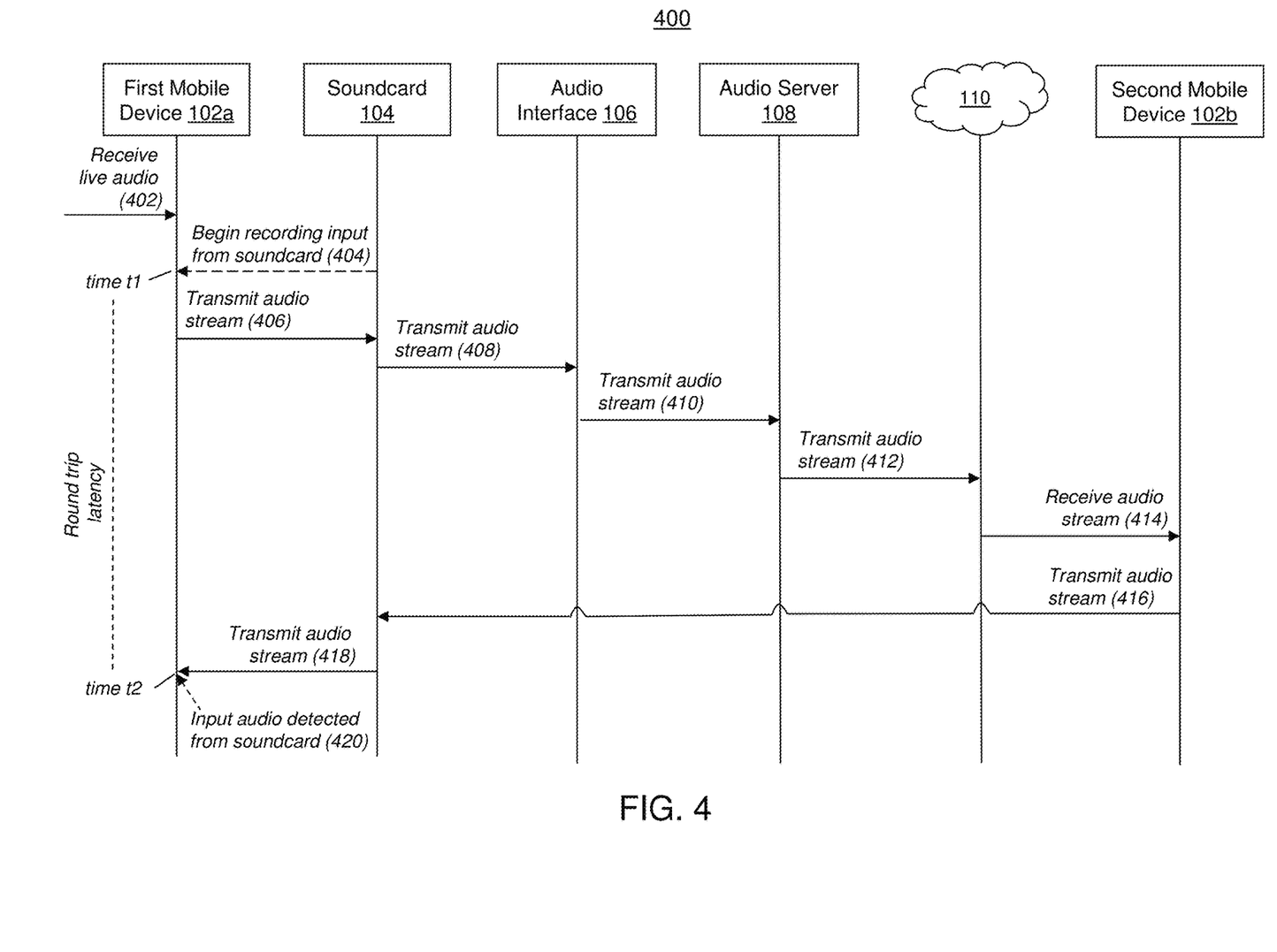
FIG. 4 is a ladder diagram for measuring round-trip audio latency of a multicomponent system, according to an illustrative embodiment of the invention.

The following is an exemplary use case for measuring round-trip audio latency. The use case is applicable to the systems, devices, and/or components illustrated in FIG. 1 and is discussed by way of reference thereto. FIG. 4 is a ladder diagram 400 for measuring round-trip audio latency of a multicomponent system. At step 402, the first mobile device 102a receives an audio signal corresponding to a live event (e.g., a concert or a sporting event). In one implementation, the first mobile device 102a is a laptop computer that receives a live audio stream from a soundboard that is capturing the audio in real time. The first mobile device 102a also comprises software that is configured to record an input audio stream received from the soundcard 104. An exemplary software program that can be used by the first mobile device 102 to record the input audio stream is Garage-Band™ available from Apple Inc. of Cupertino, California. At step 404, the software on the first mobile device 102a begins recording the input audio stream from the soundcard 104 at time t1. This is referred to as the 'Return' track in the software. As can be appreciated, an input of the soundcard 104 is coupled to the second mobile device 102b for receiving audio from the second mobile device 102b. Because the second mobile device 102b has not yet received the audio stream comprising the live audio, the first mobile device 102a detects a 'silent' audio signal from the soundcard at time t1.

At step 406, the first mobile device 102a transmits the audio stream to the soundcard 104 as output—also at time t1. For example, the soundcard 104 can connect to the first mobile device 102a via a USB-C port on the first mobile device 102a and receive the audio stream from the first mobile device via the USB-C connection.

At step 408, the soundcard 104 transmits the audio stream to the audio interface 106. In some embodiments, the soundcard 104 transmits the audio stream to the audio interface 106 via an output jack. For example, the soundcard 104 can comprise a 3.5 mm headphone jack that outputs the live audio stream via a physical cable to the audio interface 106.

At step 410, the audio interface 106 transmits the audio stream to the audio server computing device 108. The audio interface 106 can be coupled to the audio server computing device 108 via a physical Ethernet cable. In some embodiments, the audio server computing device 108 converts the audio stream into a format (e.g., packetization, compression, etc.) that can be transmitted via one or more communication networks, such as network 110.

At step 412, the audio server computing device 108 transmits the audio stream to the network 110. In some embodiments, the network 110 comprises one or more local area networks (such as a short-range wireless network comprising, e.g., wireless access points) or wide area networks (such as the Internet). At step 414, the second mobile device 102b receives the audio stream from the network 110. In some embodiments, the second mobile device 102b comprises a smartphone configured to wirelessly receive the audio stream from the network (e.g., via WiFi and/or cellular interface).

At step 416, the second mobile device 102b transmits the audio stream to the soundcard 104. As mentioned above, an input (such as a 3.5 mm microphone input jack) of the soundcard 104 is coupled to the second mobile device 102b. For example, an output port of the second mobile device 104 can be connected to the input jack of the soundcard 104 via a physical cable.

Figure 5:
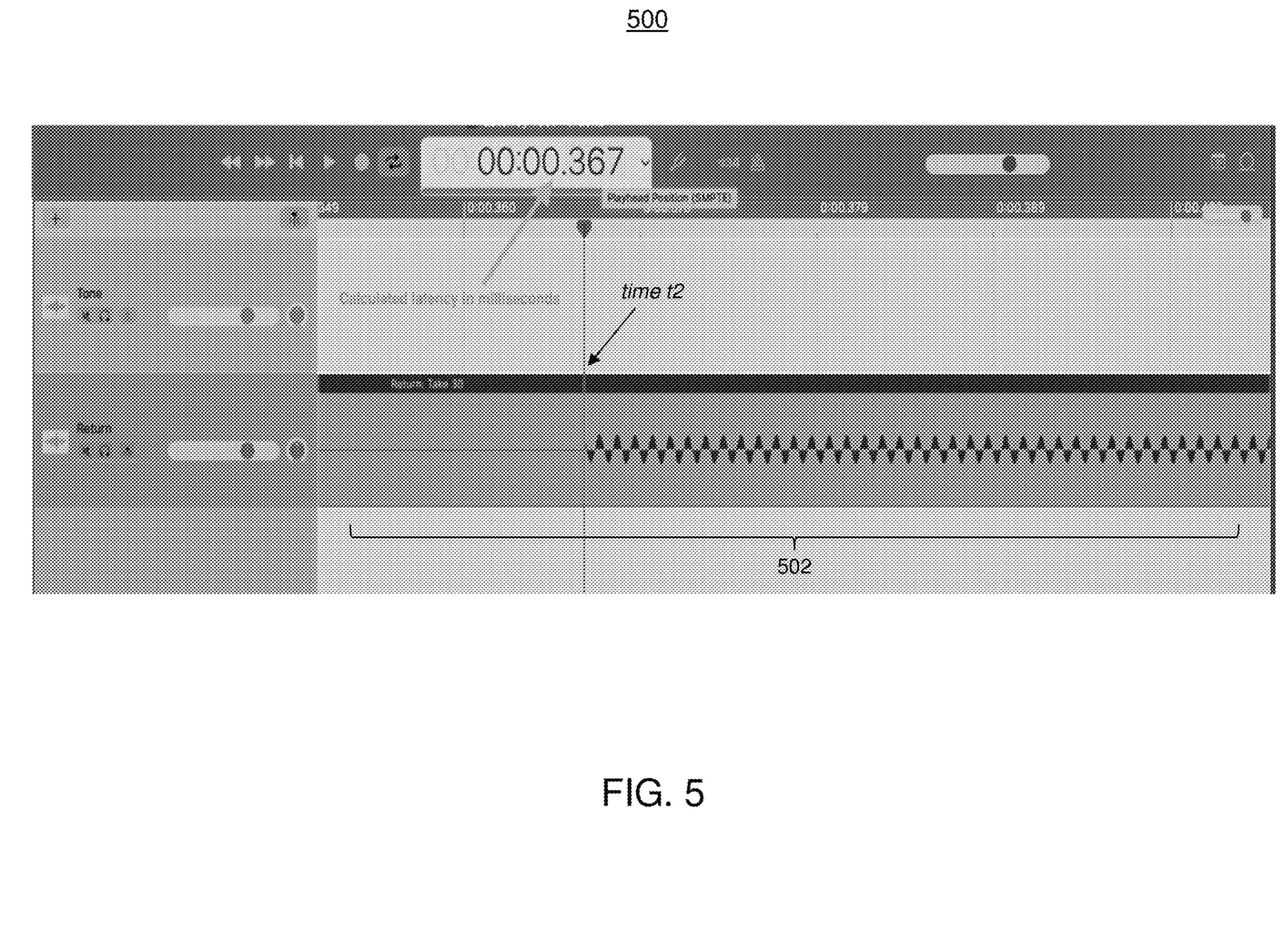
FIG. 5 is a diagram of an exemplary user interface for displaying indicia of detected input audio, according to an illustrative embodiment of the invention.

At step 418, the soundcard 104 transmits the audio stream received from the second mobile device 102b to the first mobile device 102a. At step 420, upon receiving the audio stream from the soundcard 104 at time t2, the software on the first mobile device 102a (which has been recording 'silent' input from the soundcard since time t1) detects input audio corresponding to the live audio from the soundcard 104. In some embodiments, the software displays a waveform or other indicia of detected input audio on a screen of the first mobile device 102a. FIG. 5 is a diagram of an exemplary user interface 500 for displaying indicia of detected input audio. As shown in FIG. 5, the user interface 500 displays a waveform 502 corresponding to the 'Return' track (i.e., the audio received from the second mobile device 102b via the soundcard 104). At time t2, the waveform 502 changes from a 'silent' signal (i.e., a straight line) to the live audio signal (i.e., the wave shape)—indicating that the live audio signal is now being received by the second mobile device 102b. In this example, time t1 is 00:00.000 and time t2 is 00:00.367. The first mobile device 102a calculates the round-trip audio latency (r) based upon the difference between t1 and t2:

$$r = t2 - t1$$

In this example, the round-trip audio latency is 0.367 seconds (00:00.367-00:00.000). The software can be configured to automatically calculate the round-trip audio latency and display the calculated latency on a screen of the first mobile device 102a and/or the second mobile device 102b.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier Internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

While the invention has been particularly shown and described with reference to specific preferred embodiments, it should be understood by those skilled in the art that various changes in form and detail may be made therein without departing from the spirit and scope of the invention as defined by the following claims.

What is claimed is:

1. A computerized method of measuring round-trip audio latency, the method comprising:
    communicatively coupling a soundcard to a first mobile device, a second mobile device, and an audio interface;
    transmitting, by the first mobile device, a first audio signal to the soundcard;
    receiving, by the second mobile device, the first audio signal via an audio server computing device communicatively coupled to the audio interface;
    transmitting, by the second mobile device, a second audio signal to the soundcard;
    receiving, by the first mobile device, the second audio signal from the soundcard; and
    calculating, by the first mobile device, a round-trip audio latency based on the transmitted first audio signal and the received second audio signal.

2. The computerized method of claim 1, wherein the soundcard comprises an external soundcard.

3. The computerized method of claim 2, wherein an output of the external soundcard is communicatively coupled to an input of the audio interface.

4. The computerized method of claim 2, wherein an input of the external soundcard is communicatively coupled to an output of the second mobile device.

5. The computerized method of claim 1, further comprising generating for display, by the first mobile device, a first waveform corresponding to the transmitted first audio signal and a second waveform corresponding to the received second audio signal.

6. The computerized method of claim 5, wherein the round-trip audio latency is calculated based on the first waveform and the second waveform.

7. The computerized method of claim 6, wherein the round-trip audio latency is calculated based on a time-delay between the first waveform and the second waveform.

8. The computerized method of claim 1, further comprising generating for display, by the first mobile device, the round-trip audio latency on the first mobile device.

9. The computerized method of claim 1, further comprising transmitting, by the first mobile device, a notification comprising the round-trip audio latency to the second mobile device.

10. The computerized method of claim 9, further comprising generating for display, by the second mobile device, the notification comprising the round-trip audio latency on the second mobile device.

11. A system for measuring round-trip audio latency, the system comprising:
    an audio interface communicatively coupled to a soundcard and an audio server computing device;
    a first mobile device communicatively coupled to the soundcard, the first mobile device configured to:
    transmit a first audio signal to the soundcard;
    receive a second audio signal from the soundcard; and
    calculate a round-trip audio latency based on the transmitted first audio signal and the received second audio signal; and
    a second mobile device communicatively coupled to the soundcard and communicatively coupled to the audio server computing device over a network, the second mobile device configured to:

receive the first audio signal via the audio server computing device; and transmit the second audio signal to the soundcard.

12. The system of claim 11, wherein the soundcard comprises an external soundcard.

13. The system of claim 12, wherein an output of the external soundcard is communicatively coupled to an input of the audio interface.

14. The system of claim 12, wherein an input of the external soundcard is communicatively coupled to an output of the second mobile device.

15. The system of claim 11, wherein the first mobile device is further configured to generate for display a first waveform corresponding to the transmitted first audio signal and a second waveform corresponding to the received second audio signal.

16. The system of claim 15, wherein the round-trip audio latency is calculated based on the first waveform and the second waveform.

17. The system of claim 16, wherein the round-trip audio latency is calculated based on a time-delay between the first waveform and the second waveform.

18. The system of claim 11, wherein the first mobile device is further configured to generate for display the round-trip audio latency on the first mobile device.

19. The system of claim 11, wherein the first mobile device is further configured to transmit a notification comprising the round-trip audio latency to the second mobile device.

20. The system of claim 19, wherein the second mobile device is further configured to generate for display the notification comprising the round-trip audio latency on the second mobile device.

* * * * *